F. P. NOURSE.
SPECULUM.
APPLICATION FILED APR. 26, 1913.
1,090,746.
Patented Mar. 17, 1914.
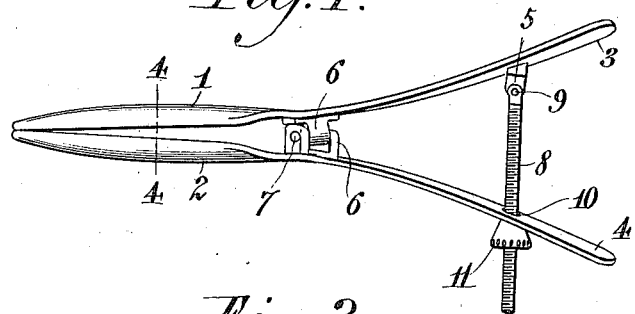
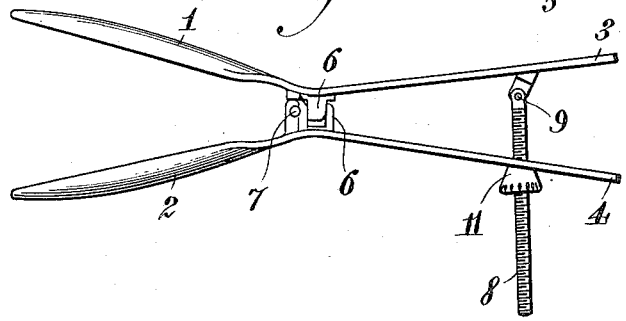
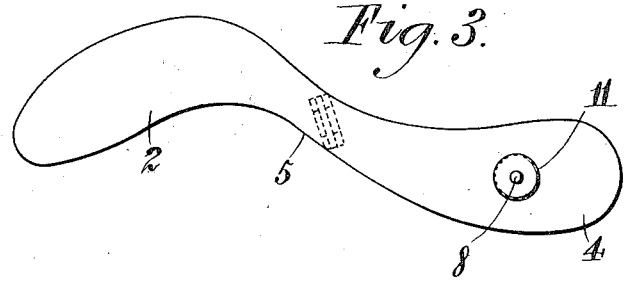
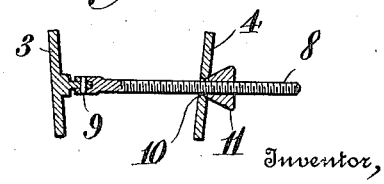
Witnesses:
Christ Feinle Jr.,
C. C. Hines.
Inventor,
Frank P. Nourse.
By Victor J. Evans,
Attorney.

UNITED STATES PATENT OFFICE.

FRANK P. NOURSE, OF LEWISTON, IDAHO.

SPECULUM.

1,090,746. Specification of Letters Patent. Patented Mar. 17, 1914.

Application filed April 26, 1913. Serial No. 763,812.

*To all whom it may concern:*

Be it known that I, FRANK P. NOURSE, a citizen of the United States, residing at Lewiston, in the county of Nez Perce and State of Idaho, have invented new and useful Improvements in Specula, of which the following is a specification.

This invention relates to speculum especially designed for use in dilating the anal canal or lower portion of the rectum for examination and the treatment of diseases affecting this locality, such as piles, fissures, ulcers, etc.

The object of the invention is to provide a device of this character whereby the anal canal may be dilated in a natural way, that is, from within outwardly, thus enabling the canal to be dilated with little or no pain or inconvenience and so that the surfaces may be easily inspected and treated.

The invention consists, of the features of construction, combination and arrangement of parts hereinafter fully described and claimed, reference being had to the accompanying drawing in which:—

Figure 1 is a plan view of the device as arranged for introduction. Fig. 2 is a similar view of the device as arranged for dilation. Fig. 3 is a view in side elevation. Figs. 4 and 5 are transverse sections on the lines 4—4 and 5—5 of Fig. 1.

The device comprises a pair of blades 1 and 2 provided, respectively, with handles 3 and 4, which are preferably integral with the blades and connected therewith narrow neck portions 5. These neck portions are provided on their inner faces with lugs 6 apertured for the passage of a pintle pin 7, whereby the blades and handles are pivotally coupled for lateral motion.

The blades 1 and 2 are longitudinally curved in an upward and forward direction, while the handles 3 and 4 are preferably downwardly and rearwardly curved, each blade and its handle having a compoundly-curved or S-shaped formation and the blades and handles pivoting on the neck portions as an axis of motion. It will be observed that the pivot pin 7 is inclined at a downward and forward angle of inclination, whereby the blades are adapted to spread easily on divergent lines without material relative change in the relation of the neck portions.

The blades and their handles diverge relatively, the blades having minimum and the handles maximum divergence when the blades are closed. By moving the handles toward each other the degree of divergence of the blades may be increased to any degree up to their maximum spread, which may be sufficient for all necessary dilation. For the purpose of holding the blades spread to any desired degree, a screw 8 is pivoted, at one end, as at 9, to the handle 3 and passes loosely through a guide opening 10 in the handle 4, whereby it is free to assume different angular position, said screw being provided with an adjustive and stop nut 11.

The blades are convexly curved or spoon-shaped in cross section, so as to present convex outer faces to conform to the curvature of the canal and prevent injury to the tissues, and said blades have a degree of divergence from their lower to their upper edges, whereby the canal may be dilated so as to roll the membrane and skin outward for more ready and convenient inspection.

In use, the device is inserted with the blades closed until they are in the rectal pouch and the neck of the instrument is in the rectal canal, after which the blades are spread to the desired degree. By then partially withdrawing the instrument the canal may be dilated to the extent necessary and held in such position, allowing the surfaces to be readily seen, examined and treated. In such operation of partially withdrawing the inserted instrument the canal is dilated from within outward, similar to the manner in which it is dilated naturally in expelling a large fecal mass, by which the operation may be performed with little or no pain or inconvenience and with greater advantage in examining and treating the affected parts. The invention thus overcomes the objection to anal dilators of the usual type in which the blades move in parallelism and cause intense pain as the force is applied in an unnatural direction.

Having thus described the invention, what is claimed is:—

An anal dilator comprising longitudinal and transversely diverging concavo-convex blades and divergent handles connected with the blades, each handle being integral with its blade and the blades and handles having their inner and outer surface arranged in the same general plane, the said blades being connected with the handles by narrow neck portions set edgewise in planes at right angles to the movements of the blades, and a pivotal connection between the narrow neck portions arranged to form an axis inclined to the plane of motion of the blades.

In testimony whereof I affix my signature in presence of two witnesses.

FRANK P. NOURSE.

Witnesses:
 JOHN P. ROSS, Sr.,
 CHARLES S. BOREN.

Copies of this patent may be obtained for five cents each, by addressing the "Commissioner of Patents, Washington, D. C."